Fig. 1.

Inventor
Fred T. MacKenzie
By His Attorney

Sept. 2, 1952   F. T. MacKENZIE   2,608,702
CONTROLLING MEANS FOR POWER-OPERATED MACHINES
Filed Jan. 30, 1951   8 Sheets-Sheet 4

Inventor
Fred T. MacKenzie
By His Attorney

Inventor
Fred T. MacKenzie
By His Attorney

Sept. 2, 1952   F. T. MacKENZIE   2,608,702
CONTROLLING MEANS FOR POWER-OPERATED MACHINES
Filed Jan. 30, 1951   8 Sheets-Sheet 7

*Inventor*
Fred T. MacKenzie
By His Attorney

Sept. 2, 1952　　　　F. T. MacKENZIE　　　　2,608,702
CONTROLLING MEANS FOR POWER-OPERATED MACHINES
Filed Jan. 30, 1951　　　　　　　　　　　　8 Sheets—Sheet 8

Inventor
Fred T. MacKenzie
By His Attorney

Patented Sept. 2, 1952

2,608,702

UNITED STATES PATENT OFFICE 2,608,702

CONTROLLING MEANS FOR POWER-OPERATED MACHINES

Fred T. MacKenzie, Beverly, Mass., assignor to United Shoe Machinery Corporation, Flemington, N. J., a corporation of New Jersey Application January 30, 1951, Serial No. 208,589

12 Claims. (Cl. 12—8.8)

This invention relates to controlling means for power-operated machines, and is herein shown as applied to a toe-lasting machine constructed generally as disclosed in United States Letters Patent No. 2,160,846, granted on June 6, 1939, on an application of F. C. Eastman and A. F. Pym, but modified in accordance with later disclosures including that of Letters Patent No. 2,380,407, granted on July 31, 1945, on an application of P. E. Burby. It is to be understood, however, that the invention is not limited to machine organizations of that particular character and that in some aspects it is not limited to machines for operating on shoes.

The machine to which the invention is thus shown as applied is a power-operated machine having wipers which wipe the marginal portion of the toe end of a welt shoe upper into lasted position over the feather and against the welt-attaching lip of the insole in the course of a cycle of operations initiated by the tripping of a clutch. In accordance with Letters Patent No. 2,160,846, the operation of the machine is stopped automatically by control of the clutch twice before the end of the cycle, once to enable the operator to fasten a toe binder wire to a tack at the left-hand side of the shoe bottom and to pull the wire preliminarily against the upper around the toe, and again thereafter to enable the operator to secure the wire, fully applied in holding relation to the margin of the upper, to a tack at the right-hand side of the shoe bottom. Heretofore such a machine has been started initially and after each pause in the cycle by depression of a clutch-actuating treadle. The shoe is presented bottom upward to the machine by the operator with the bottom of the toe end of the insole in engagement with a shoe rest against which the shoe is thereafter clamped by an upwardly movable toe rest engaging the shoe underneath on the top of the forepart. Heretofore this toe rest has been moved upwardly to clamp the shoe at the beginning of the cycle while the operator is still holding the shoe in his hands, this movement of the toe rest being followed immediately by the movement of a heel rest into engagement with the heel end of the shoe to assist in holding the shoe against lengthwise displacement.

An object of the present invention is to avoid any possible danger of injury to one of the operator's hands by being caught between the power-operated toe rest and the shoe. To this end, the construction herein shown is such as to require that both his hands shall be away from the shoe when the machine is first started. More particularly, the machine is provided with a starting member arranged to be moved by the operator's left hand to operate mechanism for tripping the clutch, a device for initially locking this member against operative movement and a member requiring the use of the operator's right hand to move the locking device to inoperative position and to hold it in that position until the machine is started. Since use of the operator's hands in this manner requires that the shoe be otherwise supported prior to the starting of the machine, a treadle is provided for moving the toe rest upwardly into position to clamp the shoe against the shoe bottom rest after the shoe has been presented. At the beginning of the cycle mechanism like that used heretofore for imparting the upward movement to the toe rest automatically assumes control thereof and holds it against the shoe, thus permitting release and return of the treadle. To prevent an operator from defeating the object in view by immobilizing the member operated by his right hand with the locking device in inoperative position, the construction is such that the device is disconnected from this member as an incident to the starting of the machine.

Since use of the operator's right hand is required to control the binder wire when the machine is started the second time, in the machine herein shown the above-mentioned locking device is held at this time in an inoperative position so that there is nothing to prevent the use of the starting member operated by the operator's left hand to trip the clutch. For this purpose a connection is provided between the locking device and the mechanism which, as above described, assumes control of the toe rest at the beginning of the cycle. By the same means the locking device is held inoperative also when the machine is to be started the third time if it is stopped twice in the course of the cycle, the second stop, however, being sometimes omitted in the use of machines of the kind to which the invention is shown as applied.

In order that the operator may, if desired, have both hands free for other uses when the machine is started the second time and, it may be, the third time, the machine is further provided with means for rendering the treadle which operates the toe rest alternatively effective to trip the clutch except in the initial starting of the machine. In the construction shown this means comprises a member which, in response to the movement of the mechanism which automatically assumes control of the toe rest at the beginning of the cycle, is moved from an idle position into position to transmit movement from the treadle to the clutch-tripping mechanism.

In order still further to guard against injury to the operator, the machine herein shown is provided with a device for insuring against any tripping of the clutch when a motor which drives the machine is not running, this device being arranged to lock the hand-operated starting member against operative movement even though the previously mentioned locking device controlled by the operator's right hand has been moved to inoperative position. This additional locking device is controlled by the pressure of lubricating oil generated by a pump which is driven by the motor whenever the motor is running, the device being operative when the motor is idle but being rendered inoperative by the pressure of the oil in response to the starting of the motor.

The above and other features of the invention, including various novel details of construction and combinations of parts, will now be more particularly described with reference to the accompanying drawings and thereafter pointed out in the claims.

Figure 2:
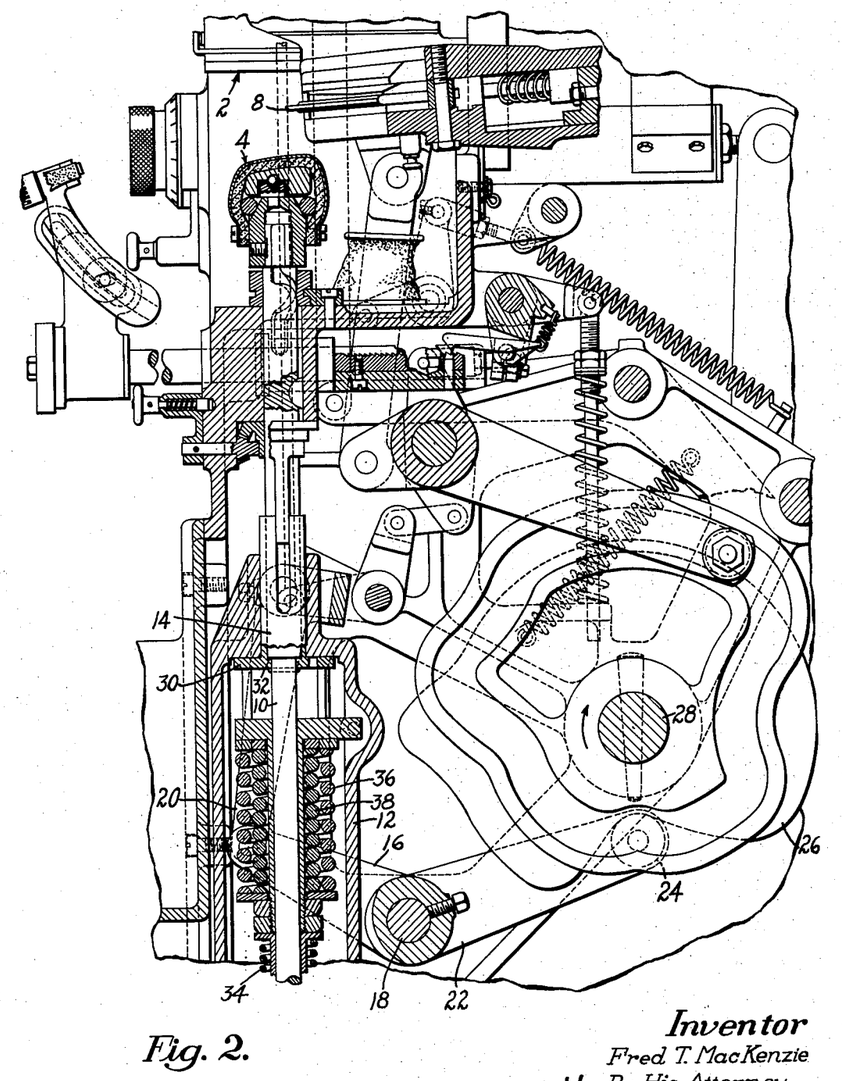
Fig. 2 is a view on an enlarged scale, partly in right-hand side elevation and partly in section, of a portion of the machine.
Figures 11, 12:
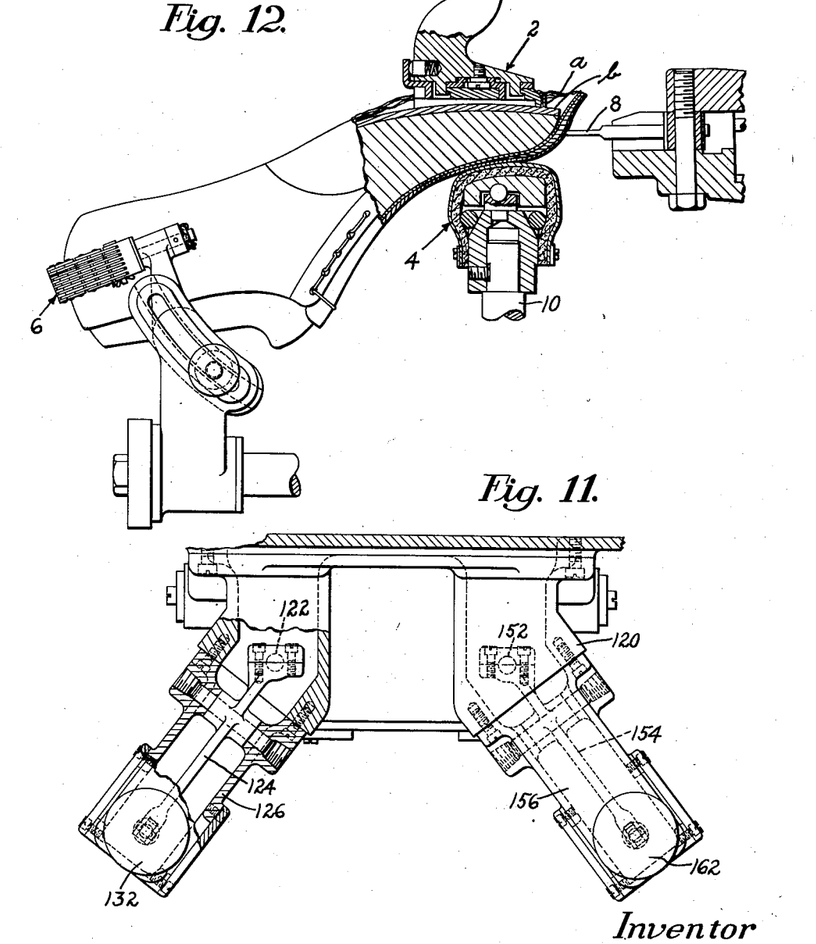
Fig. 11 is mainly a plan view, with parts broken away, showing a portion of the starting means and of controlling mechanism associated therewith.
Fig. 12 is a view partly in right-hand side elevation and partly in section, showing a shoe as positioned for the operation of the machine thereon.

In view of the prior disclosures only as much of the machine will be herein described as is necessary for an understanding of the invention. The machine is provided with a shoe rest 2 (Figs. 2 and 12) against which the operator presents the shoe on its last, this shoe rest having means for engaging the bottom face of the toe end of the insole and the inner face of a welt-attaching lip $a$ on the insole to position the shoe heightwise, lengthwise and laterally. The shoe is clamped and held against the shoe rest 2 by a toe rest 4 arranged to engage the upper underneath on the top of the forepart, and it is further controlled by a heel rest 6 which is moved rearwardly into engagement with its heel end shortly after the beginning of the cycle of operations. In the course of the cycle toe-embracing wipers 8 wipe the toe end of the upper heightwise of the last and wipe its marginal portion inwardly over the feather $b$ of the insole and against the lip $a$ into position to be secured by a binder wire applied around the toe as described in Letters Patent No. 2,160,846. To cooperate with the wipers in the toe-lasting operation there is provided a retarder not herein shown but like that disclosed in Letters Patent No. 2,380,407, this retarder being used in place of the upper-pulling grippers shown in Letters Patent No. 2,160,846.

The toe rest 4 is mounted on the upper end of a rod 10 vertically movable in bearings in the frame of the machine and in the construction herein shown is controlled in the course of the operation of the machine by mechanism substantially like that disclosed in Letters Patent No. 2,224,146, granted on December 10, 1940, on an application of F. C. Eastman. This mechanism includes a yoke 12 slidingly mounted at its lower end on the rod 10 and at its upper end on a sleeve 14 (Fig. 2) through which the rod extends. The yoke is raised by a pair of crank arms 16 located respectively at its opposite sides and fast on a rockshaft 18, the crank arms being connected by links 20 to the upper end of the yoke. Also fast on the rockshaft is an arm 22 provided with a roll 24 which is engaged by a peripheral cam 26 fast on a cam shaft 28. Integral with the lower end of the sleeve 14 is a disk 30 arranged to engage a shoulder 32 formed on a diametrically enlarged upper portion of the rod 10. The yoke 12 carries spring mechanism through which it acts on the disk 30 to force the toe rest yieldingly against the shoe when the yoke is moved upwardly by the cam 26, the disk acting on the rod 10 by its engagement with the shoulder 32 on the rod. This spring mechanism includes a comparatively light spring 34 through which the toe rest is controlled during a portion of the toe-lasting operation and a pair of heavier springs 36 and 38 through one or the other or both of which selectively it is thereafter controlled to support the shoe against increased downward pressure of the wipers on the upper over the insole. For a better understanding of details of this construction the disclosure of Letters Patent No. 2,224,146 may be consulted.

Figure 1:
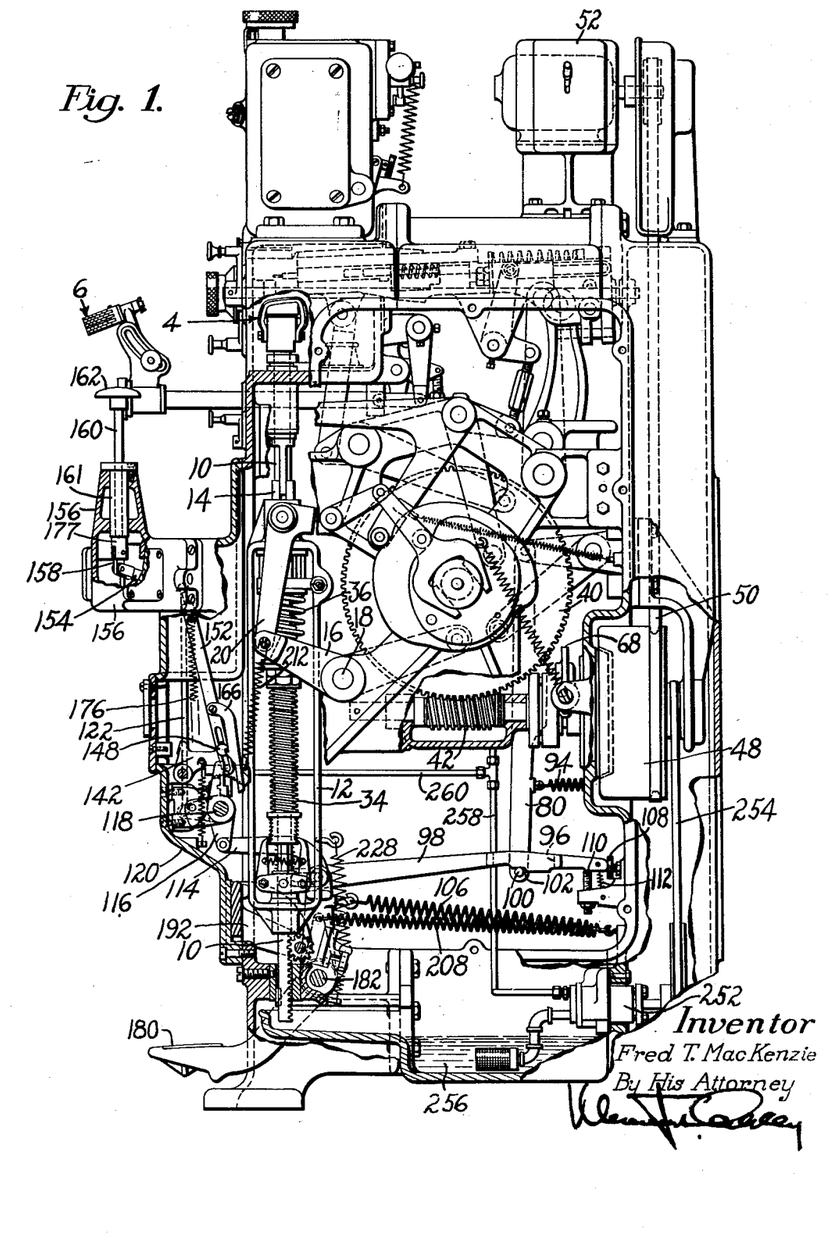
Fig. 1 is a view in right-hand side elevation of the machine to which the invention is herein shown as applied, with parts broken away.
Figures 4, 5:
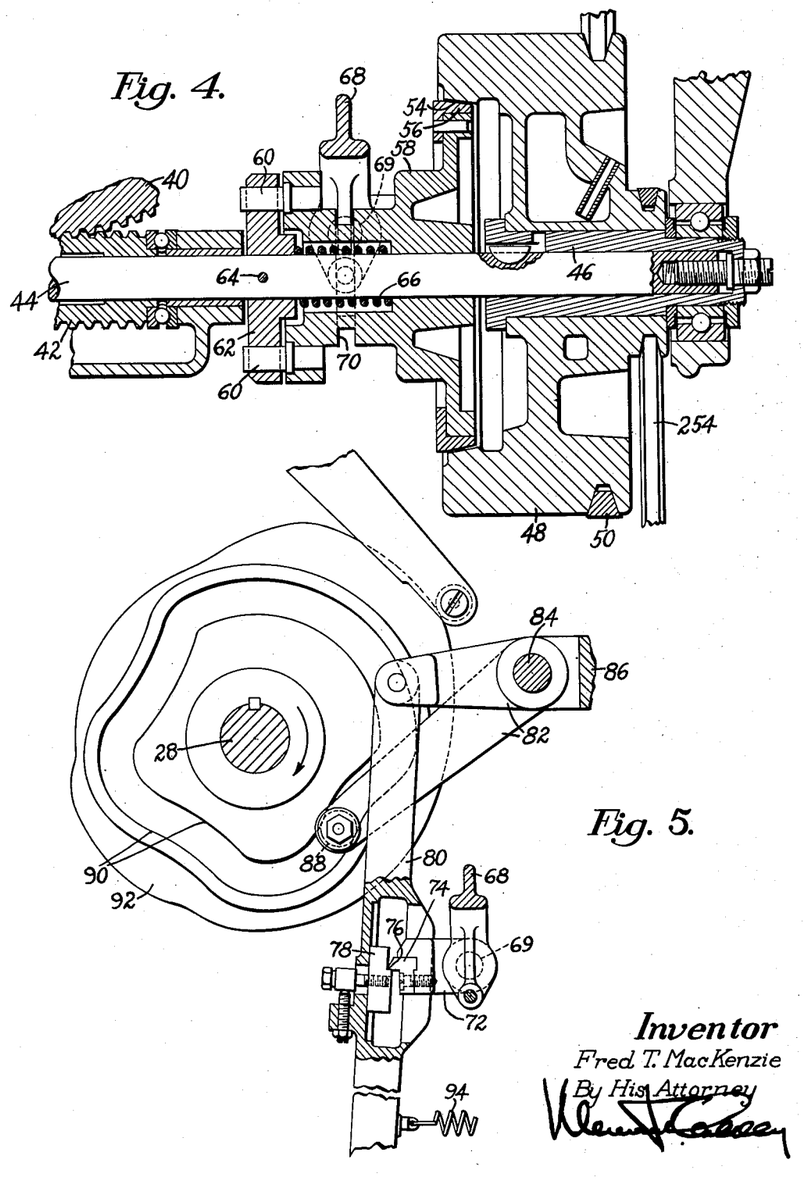
Fig. 4 is a vertical sectional view of the clutch and parts associated therewith.
Fig. 5 is a view in right-hand side elevation of a portion of the clutch-controlling mechanism, with parts broken away.
Figure 6:
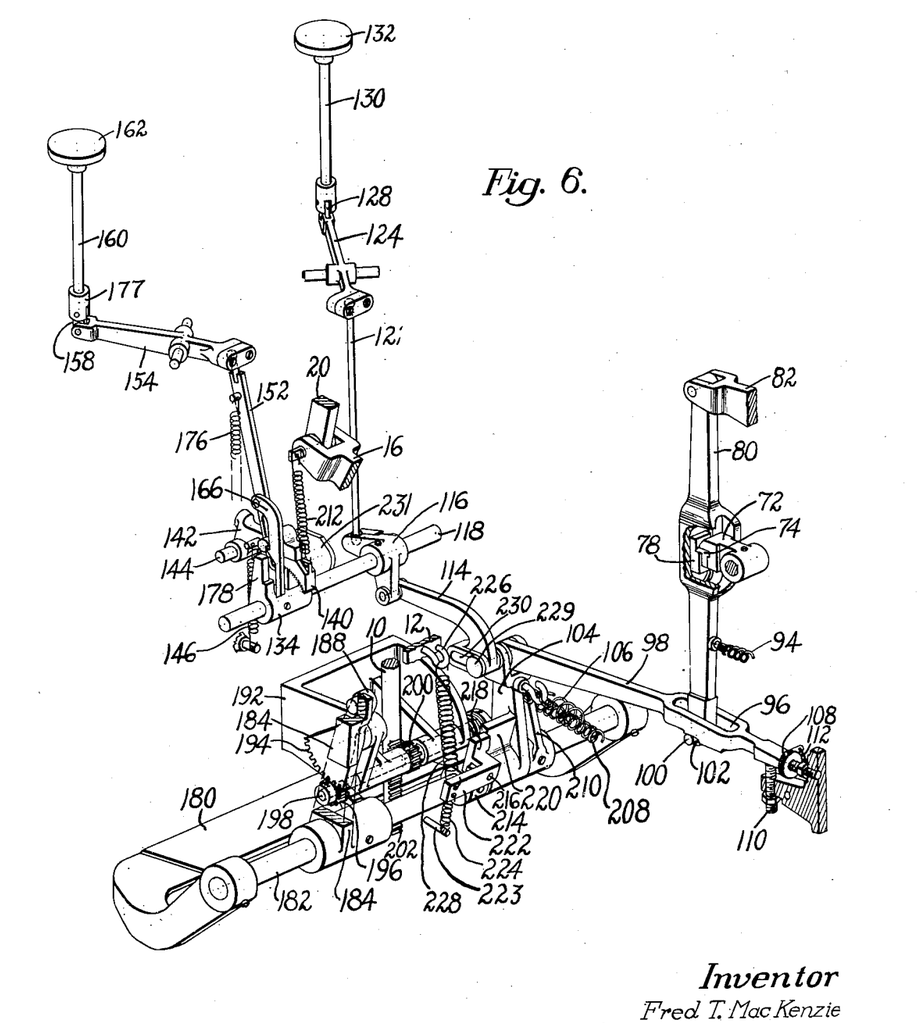
Fig. 6 is a perspective view showing mainly parts provided for purposes of the present invention.

The cam shaft 28 has mounted thereon not only the cam 26 but other cams by which different parts of the machine are operated, and the cycle of operations is performed by one complete revolution of this cam shaft. Fast on the cam shaft is a worm gear 40 driven by a worm 42 fast on a shaft 44, and keyed to this shaft is a sleeve 46 (Fig. 4) on which is rotatably mounted a clutch member 48 driven continuously through a belt 50 by an electric motor 52 supported on the top of the frame of the machine. The clutch member 48 has a friction face 54 arranged to be engaged by a friction ring 56 fast on a cooperating clutch member 58 which is slidable lengthwise of the shaft 44 but is connected to the shaft to turn therewith by two pins 60 secured to the member 58 and slidable in openings formed in a member 62 secured to the shaft by a pin 64. A spring 66 mounted in an annular recess in the clutch member 58 and bearing against the member 62 tends to move the member 58 into position to be driven by the member 48. The member 58 is controlled by a yoke 68 mounted on a shaft 69 to swing about an axis located between its upper and lower ends and having pivotally mounted on the lower ends of its two arms a pair of shoes (not shown) lying in a groove 70 in the member 58. Mounted on the shaft 69 to swing with the yoke is an arm 72 on the end of which is secured a latch 74 which is normally engaged underneath by a shoulder 76 formed on a block 78 to hold the yoke in such a position that the clutch member 58 is disconnected from the clutch member 48. The block 78 is fast on an upwardly and downwardly extending arm 80 pivotally mounted at its upper end on one arm of a bell-crank lever 82 which is pivotally mounted at 84 on a lug 86 on the frame, the other arm of this bell-crank lever carrying a roll 88 which lies in a cam track 90 formed in one side of a cam member 92 on the cam shaft 28. A spring 94 tends to swing the arm 80 in a rearward direction and thus to hold the shoulder 76 under the latch 74. The lower end of the arm 80 extends through a slot 96 (Figs. 1 and 6) formed in a substantially horizontal bar 98 and below the bar carries a pin 100 arranged to engage shoulders 102 on the bar. The bar 98 is pivotally connected at its front end to an upwardly extending arm 104 mounted for forward and rearward swinging movements as hereinafter described, and a spring 106 connected to this arm tends to swing it in a rearward direction and thus holds the rear end of the bar 98 normally against the head of a screw 108 which is threaded in the frame and is adjustable to determine the normal position of the bar lengthwise. The rear end of the bar is supported adjustably on the upper end of a screw 110 threaded in a lug on the frame and is held normally down on this screw by a spring 112 (Fig. 1). It will thus be seen that when the bar 98 is moved in a forward direction it acts on the pin 100 to swing the arm 80 forwardly and thus to disengage the block 78 from the latch 74. This permits the spring 66 to force the clutch member 58 into position to be driven by the member 48. To stop the operation of the machine the arm 80 is lowered by the action of the cam track 90 on the bell-crank lever 82 to carry the shoulder 76 again to a position below the latch 74, after which the arm is raised to swing the yoke 68 into position to disconnect the clutch member 58 from the member 48. As hereinafter more particularly explained, the cam track 90 is so formed as to stop the operation of the machine twice in the course of the cycle as well as at the end of the cycle.

Figure 3:
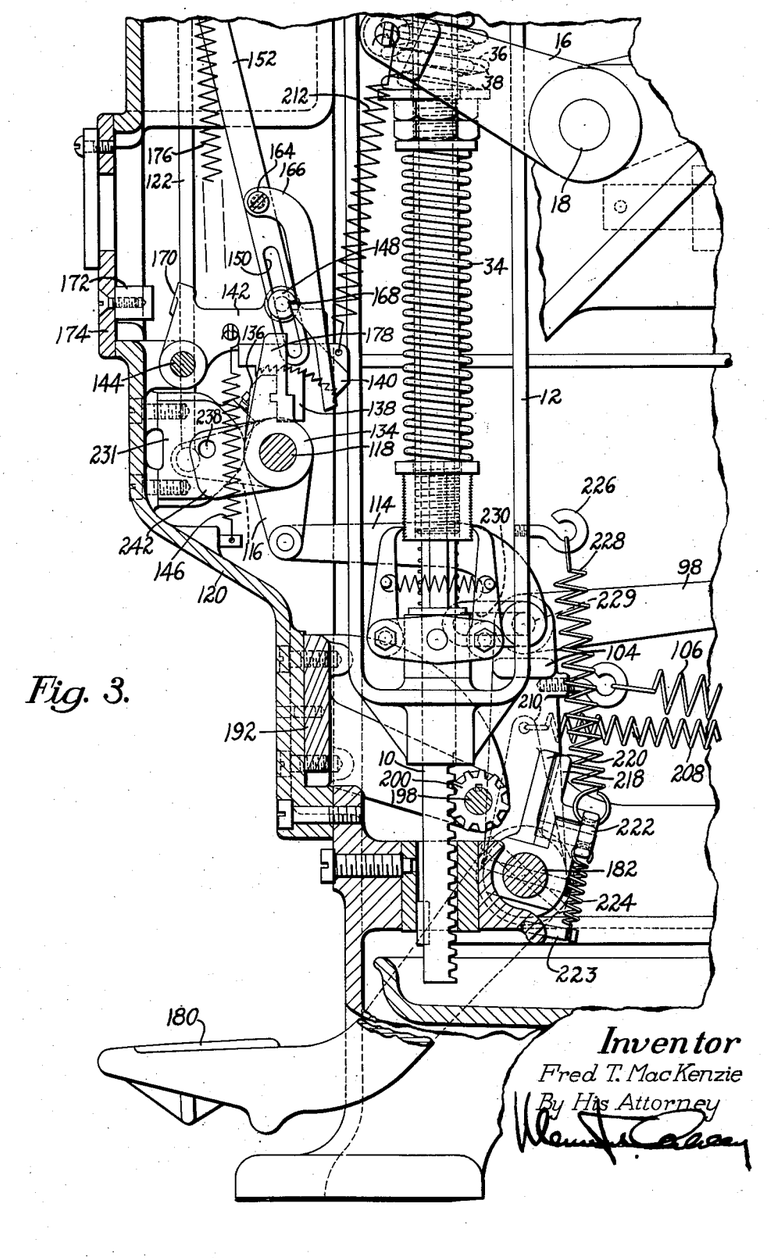
Fig. 3 is a view on a still larger scale, partly in right-hand side elevation and partly in section, of a portion of the machine below that shown in Fig. 2.
Figure 7:
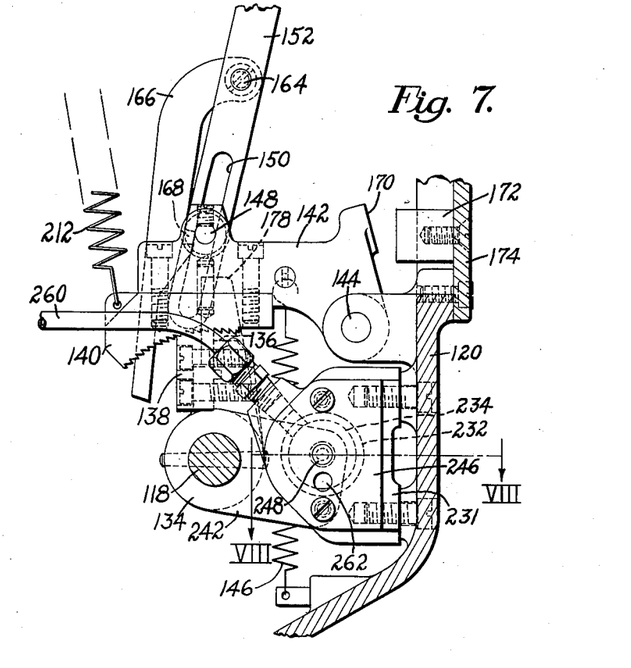
Fig. 7 is a view mainly in left-hand side elevation of a portion of the structure shown in Figs. 1 and 6 for controlling the starting of the machine.
Figure 8:
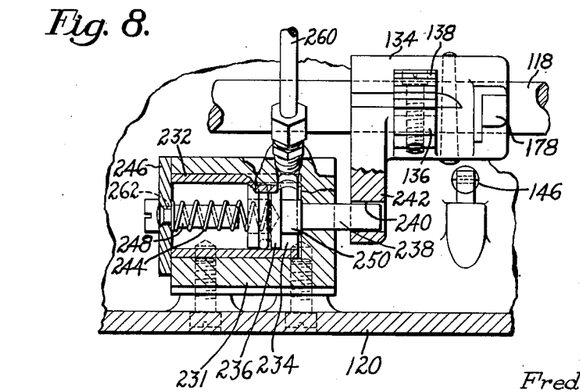
Fig. 8 is a view partly in plan of a portion of the structure shown in Fig. 7, with parts in section mainly on the line VIII—VIII of Fig. 7.

In machines such as that to which the invention is herein shown as applied the above-mentioned arm 104 has heretofore been swung forwardly to start the machine by depression of a treadle and the toe rest 4 has been moved upwardly by the cam-operated yoke 12 into position to clamp the shoe against the shoe rest 2 at the beginning of the cycle, the shoe being supported at this time by the operator's hands. In order to avoid any possible danger of injury to one of his hands by being caught between the power-operated toe rest and the shoe, the construction provided by the present invention is such as to require that both his hands shall be away from the shoe when the machine is first started, the toe rest having first been moved upwardly into position to support the shoe as hereinafter described. For the purpose in view the arm 104 is connected by a link 114 to one arm of a bell-crank lever 116 which is fast on a rockshaft 118 mounted in a casting 120 secured on the front of the frame. The other arm of the bell-crank lever 116 is connected by a link 122 (Fig. 6) to one arm of a lever 124 pivotally mounted between its ends on a bracket 126 (Fig. 11) secured to the casting 120, the other arm of this lever being connected by a link 128 to a rod 130 vertically movable in a bearing in the bracket. On the upper end of the rod 130 is a knob 132 arranged to be engaged by the operator's left hand to move the rod downwardly and thereby to trip the clutch and start the machine by imparting forward movement to the bar 98. Initially, however, the rockshaft 118 is locked against turning movement in the direction to start the machine and must be unlocked to permit such starting of the machine. Fast on the rockshaft is a sleeve 134 (Figs. 7 and 8) having formed thereon an upwardly extending arm 136 to which is secured a block 138 provided with ratchet teeth on its upper end. In engagement with these teeth are complemental ratchet teeth formed on a block 140 secured to an arm 142 which is pivotally mounted at 144 on the casting 120. A spring 146 connected to the arm 142 tends to swing the arm downwardly and holds the teeth on the block 140 initially in engagement with the teeth on the block 138, thus preventing any turning movement of the rockshaft 118 in the direction to start the machine. Fast on the arm 142 is a pin 148 which extends through a slot 150 formed in an upwardly extending link 152, this link being connected at its upper end to one arm of a lever 154 pivotally mounted between its ends on a bracket 156 (Fig. 11) on the casting 120. The other arm of the lever 154 is connected by a link 158 to a rod 160 vertically movable in a sleeve 161 (Fig. 1) in the bracket 156, this rod having on its upper end a knob 162 arranged to be engaged by the operator's right hand to depress the rod. Pivotally mounted on a pin 164 on the link 152 is a latch 166 arranged initially to engage an enlarged head formed on the pin 148 in a notch 168 formed in the head. Accordingly, downward movement of the rod 160 by the operator's right hand causes the latch 166 to swing the arm 142 upwardly, thus unlocking the rock shaft 118 to permit the operator to start the machine by moving the rod 130 downwardly with his left hand while continuing to hold the rod 160 depressed with his right hand. The movement of the arm 142 by the rod 160 is limited by engagement of a face 170 on the arm with a block 172 fast on a plate 174 secured to the casting 120. When the operator releases the rod 160 the link 152 is returned to its initial position by a spring 176 (Figs. 1 and 3), the return movement of the link and the rod being limited by engagement of a coupling 177 on the rod with the lower end of the sleeve 161.

In order to prevent any operator from defeating the object in view by tying the rod 160 down, thus enabling him to use only one hand in the starting of the machine, there is formed on the sleeve 134 an upwardly extending arm 178 which is swung by the rockshaft 118 into engagement with the lower end portion of the latch 166 and immediately after the tripping of the clutch disengages the latch from the pin 148 by swinging it about the pin 164. The arm 142, therefore, will not continue to be held up by the rod 160 even though the rod should remain depressed.

Figure 9:
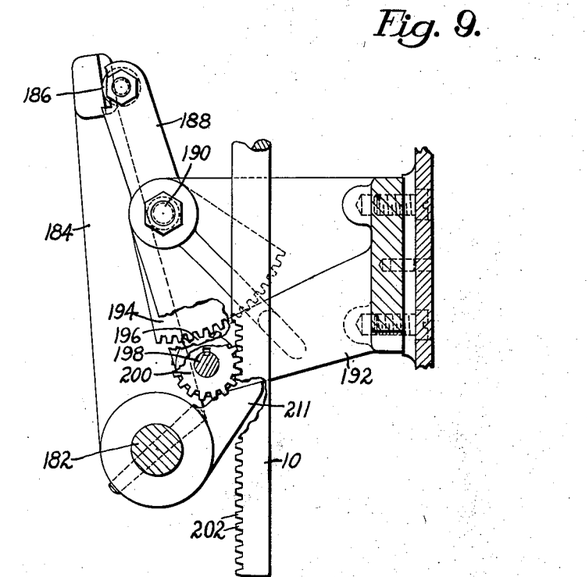
Fig. 9 is a view in left-hand side elevation of means shown in Figs. 1 and 6 for raising the toe rest, with parts broken away.
Figure 10:
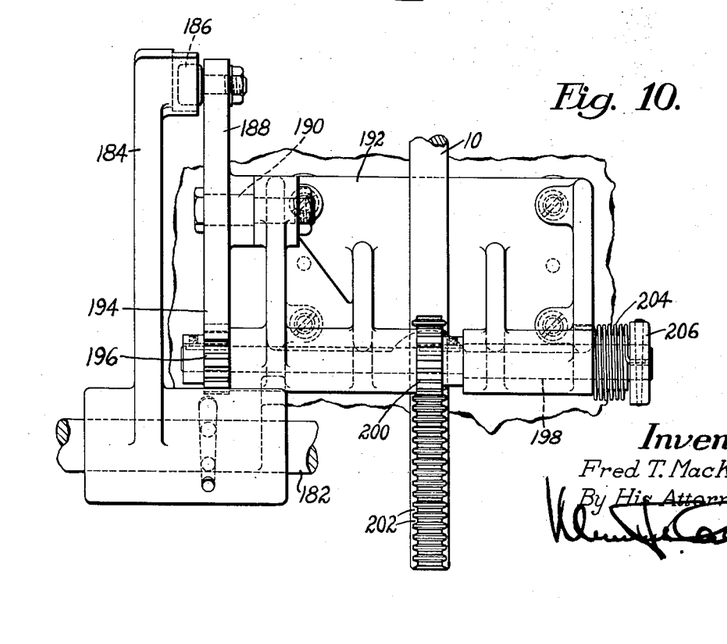
Fig. 10 is a view in rear elevation of the parts shown in Fig. 9.

In order that the operator may be able to use both hands as above described in starting the machine initially, the toe rest 4, instead of being moved upwardly as heretofore by the cam-operated crank arms 16 to clamp the shoe against the shoe rest 2 at the beginning of the cycle of operations, is moved upwardly by the operator thus to clamp the shoe by the depression of a treadle 180 prior to the starting of the cycle. The treadle is fast on a rockshaft 182 mounted in bearings in the frame, and it is on this rockshaft that the previously mentioned clutch-tripping arm 104 (Fig. 6) is mounted, the arm being loose on the rockshaft to permit it to swing independently thereof. Fast on the rockshaft is an upwardly extending arm 184 (Figs. 9 and 10) a laterally offset upper end portion of which is arranged to engage a roll 186 carried by the upper end of a lever 188 pivotally mounted between its ends on a stud 190 supported in a bracket 192 fast on the casting 120. The lower arm of the lever 188 is formed as a gear sector 194 in engagement with a pinion 196 formed on a shaft 198, this shaft being mounted in bearings in the bracket 192. Also fast on the shaft 198 is a pinion 200 in engagement with rack teeth 202 formed on the lower end portion of the rod 10 which supports the toe rest. It will thus be seen that by depression of the treadle 180 the arm 184 is swung in a forward direction and by its engagement with the roll 186 swings the lever 188 in a clockwise direction with reference to Fig. 9 to impart upward movement to the rod 10 through the gear sector 194 and the pinions 196 and 200. As the rod is thus operated it moves upward relatively to the previously mentioned sleeve 14 (Fig. 2), the shoulder 32 on the lower end of the enlarged upper portion of the rod moving upwardly away from the disk 30 in the yoke 12. In thus moving the rod 10 the shaft 198 turns against the resistance of a torsion spring 204 one end of which is anchored in the bracket 192 and the other end in a collar 206 fast on the shaft, this spring serving later to insure return of the rod. For returning the treadle 180 when released by the operator a spring 208 (Figs. 1 and 6) is connected to an arm 210 fast on the rockshaft 182, the return of the treadle being limited by engagement of a lug 211 on the hub of the arm 184 with the bracket 192. It will be understood that after moving the toe rest upwardly into clamping position the operator holds it in that position by the treadle until after the starting of the machine. Substantially at the beginning of the cycle, the yoke 12 is moved upwardly by the cam-operated crank arms 16 to carry the disk 30 again into engagement with the shoulder 32 on the rod 10 and to support the toe rest, as hereinbefore described, first through the comparatively light spring 34 and later through one or the other or both of the heavier springs 36 and 38.

As hereinbefore explained and in accordance with the disclosure of Letters Patent No. 2,160,846, the clutch-controlling cam 90 is so formed as to stop the machine automatically twice before the end of the cycle, first to enable the operator to fasten a toe binder wire to a tack at the left-hand side of the shoe bottom while the wipers 8 are holding the marginal portion of the upper wiped inwardly over the feather and against the lip of the insole and to pull the wire preliminarily against the upper around the toe adjacent to the wipers, and again thereafter to enable the operator to secure the wire, fully applied in holding relation to the margin of the upper, to a tack at the right-hand side of the shoe bottom. Since it is necessary that the operator use his right hand to control the binder wire when the machine is started after the first pause in the cycle, there is further provided means for holding the arm 142, which locks the rockshaft 118 initially against clutch-tripping movement, in an upraised position at that time with the rockshaft 118 unlocked, so that the rod 130 is free to be moved downwardly by the operator's left hand to start the machine. This means comprises a spring 212 connected at its lower end to the block 140 on the arm 142 and at its upper end to one of the crank arms 16 through which the yoke 12 is moved upwardly at the beginning of the cycle of operations. Through this spring the arm 142 is held in an idle position also when the machine is started after the second pause in the cycle, so that it may be started in the same manner at that time.

Under some conditions an operator may wish to have both hands free for other uses when he starts the machine the second time and, it may be, the third time. The construction herein shown is therefore further such that instead of starting the machine the second and third times by depression of the rod 130 the operator may start it by depression of the treadle 180. For this purpose there is fast on the treadle-operated rockshaft 182 a block 214 (Fig. 6) provided with a pin 216 extending transversely of the rockshaft and on which is pivotally mounted a member 218 located close to a lateral extension 220 of the clutch-tripping arm 104 which, as previously stated, is loose on the rockshaft. Formed on the member 218 is an arm 222 extending lengthwise of the rockshaft 182, and connected to this arm and to a fixed pin 223 is a spring 224. This spring holds the member 218 initially in such a position that it is clear of the extension 220 on the arm 104 when the treadle 180 is depressed the first time to raise the toe rest. Also connected to the arm 222 and to a hook 226 on the yoke 12 is a spring 228, and when the yoke is moved upwardly at the beginning of the cycle into position to control the toe rest it tensions the spring 228 to cause the spring to swing the member 218 to a position at the rear of the extension 220 after the operator has released the treadle. In response to a second depression of the treadle, therefore, after the machine has been stopped by the cam 90, the arm 104 is swung forwardly to trip the clutch by the action of the member 218 on the extension 220 of the arm, and the same is true if the treadle is depressed a third time after the second stop in the cycle. When the arm is thus operated a pin 229 by which it is connected to the link 114 and the bar 98 moves along a slot 230 in the link to avoid moving the link. Regardless of the provision for thus tripping the clutch by the treadle it may, if the operator desires, be tripped instead in the manner hereinbefore described by depression of the rod 130. When the yoke 12 is moved downwardly to starting position at the end of the cycle the spring 224 swings the member 218 to its idle position, so that when the treadle is depressed to move the toe rest into engagement with the next shoe the arm 104 will not be moved by the treadle.

It will be evident that, with the machine constructed as thus far described, the clutch may be tripped at a time when the motor 52 is not running and the fact that it has thus been tripped will not be evident to the operator. The machine, therefore, will start in response to the starting of the motor, the motor being started by an electrical switch (not shown). In order to guard against possible injury to the operator under those conditions, the construction shown is further such as to prevent any tripping of the clutch unless the motor is running. For this purpose there is fast on the casting 120 (Figs. 7 and 8) a casting 231 provided with a cylindrical bore in which is mounted a sleeve 232, the sleeve providing a cylinder 234 in which is a piston 236. This piston carries a pin 238 which extends, when the motor 52 is not running, into a hole 240 provided in an arm 242 which is integral with the sleeve 134 fast on the rockshaft 118, thus locking the rockshaft against turning movement and thereby preventing the tripping of the clutch by the rod 130 even though the rod 160 has been depressed to raise the locking arm 142. When the motor is not running the piston 236 is held in the position shown in Fig. 8, with the pin 238 in the hole 240, by a spring 244 mounted between the piston and a plate 246 fast on the casting 231, a pin 248 extending from the plate part way through the spring to assist in holding the spring in place. Movement of the piston by the spring is limited by engagement of a diametrically enlarged portion 250 of the pin 238 with the casting 231. The machine is provided with a lubricating pump 252 (Fig. 1) driven at all times when the motor is running by the clutch member 48 through a belt 254. The pump receives lubricating oil from a reservoir or sump 256 at the base of the machine and delivers it through a pipe 258 to portions of the machine which are to be lubricated. It will be understood that in its action on the oil the pump develops a considerable amount of fluid pressure. Leading from the pipe 258 to the portion of the cylinder 234 which is on the opposite side of the piston 236 from the spring 244 is a pipe 260. In response, therefore, to the starting of the motor 52 the fluid pressure developed by the pump moves the piston 236 against the resistance of the spring 244 to withdraw the pin 238 from the hole 240, so that the clutch can thereafter be tripped in the normal manner. At the end of every cycle of operations the hole 240 is in alinement with the pin 238, and accordingly when the motor 52 is stopped the pin is immediately projected by the spring 244 into the hole 240 to prevent any tripping of the clutch until after the motor has again been started. The left-hand end of the cylinder 234 is in communication with the atmosphere through a hole 262 (Fig. 7) in the plate 246.

The manner of operation and control of the machine, in so far as it is of interest with reference to the present invention, will now be briefly summarized. The motor 52 having been started, the pressure developed by the pump 252 holds the piston 236 (Fig. 8) and the pin 238 in retracted positions, so that the pin will not interfere with the starting of the machine. The operator presents the shoe to the machine with the bottom of its forepart in engagement with the shoe rest 2, and while holding the shoe in his hands moves the toe rest 4 upwardly to clamp and hold the shoe against the shoe rest 2 by depressing the treadle 180. At this time the member 218 (Fig. 6) is in such a position that it will clear the lateral extension 220 of the arm 104 when the treadle is depressed and will therefore not act on the arm. While continuing to hold the treadle depressed the operator moves the rod 160 downwardly with his right hand and thereby raises the arm 142 to release the rockshaft 118 and while thus holding the arm in upraised position moves the rod 130 downwardly with his left hand to trip the clutch and thus to start the machine. The turning of the rockshaft 118 as the clutch is thus tripped causes the arm 178 on the rockshaft to swing the latch 166 rearwardly and thus to release the arm 142, so that the arm will have to be raised again by another depression of the rod 160 before another cycle of operations can be initiated. Substantially at the beginning of the cycle the crank arms 16 are operated by the cam 26 to impart upward movement to the yoke 12, thereby carrying the disk 30 in the yoke into position to support the toe rest independently of the treadle and to force it against the shoe. This permits the operator to release the treadle which is returned by the spring 208. In thus moving the yoke upwardly one of the crank arms 16 acts through the spring 212 to swing the arm 142 upwardly so that it will not thereafter prevent the turning of the rockshaft 118. In its upward movement, moreover, the yoke 12 tensions the spring 228, and accordingly this spring swings the member 218 to a position at the rear of the extension 220 of the arm 104 as soon as the treadle returns to its initial position. When the wipers 8 have wiped the marginal portion of the upper into the angle between the feather and the lip of the insole the cam 90 causes the machine to come to a stop to enable the operator to fasten one end of a toe binder wire to a tack at the left-hand side of the shoe bottom and to pull the wire preliminarily inward against the upper around the toe. To trip the clutch and start the machine the second time after this pause in the cycle the operator has the choice of depressing the rod 130 by hand, without depressing the rod 160, or of depressing the treadle, such depression of the treadle causing the member 218 to impart forward swinging movement to the arm 104 and thereby to trip the clutch. The cam 90 in the construction herein shown being so formed as to stop the machine again prior to the end of the cycle to enable the operator to fasten the binder wire to a tack at the right-hand side of the shoe bottom, the operator trips the clutch again after this pause in the cycle either by depression of a rod 130 or depression of the treadle. Thereafter the parts of the machine not already in their starting positions are returned to such positions and the machine is stopped by the cam 90 at the end of the cycle.

Having described the invention, what I claim as new and desire to secure by Letters Patent of the United States is:

1. In a power-operated machine, a starting member arranged to be moved by one of the operator's hands to start a cycle of operations of the machine, a device for initially preventing the starting of the machine by said starting member, means requiring the use of the operator's other hand to move said device into position to permit the starting of the machine by the starting member and to hold it in that position until the machine is started, means for stopping the machine automatically prior to the end of the cycle, and automatic means for maintaining said device when the machine is thus stopped in position to permit the machine again to be started by said starting member.

2. In a power-operated machine, a starting member arranged to be moved by one of the operator's hands to start a cycle of operations of the machine, a device for initially locking said starting member against movement to start the machine, means requiring the use of the operator's other hand to move said device into position to unlock the starting member and to hold it in that position until the machine is started, means for stopping the machine automatically prior to the end of the cycle, and automatic means for holding said device in unlocking position when the machine is thus stopped to leave said starting member free for starting the machine again.

3. In a power-operated machine, a starting member arranged to be moved by one of the operator's hands to start a cycle of operations of the machine, a device for initially preventing such movement of said starting member, means requiring the use of the operator's other hand to move said device to an inoperative position to permit the movement of the starting member and to hold it in that position until the machine is started, means for stopping the machine automatically prior to the end of the cycle, and means movable in the cycle of operations before the machine is thus stopped into position to render said device inoperative and thus to permit the machine again to be started by said starting member.

4. In a power-operated machine, a clutch through which the machine is operated, a starting member arranged to be moved by one of the operator's hands to actuate said clutch and thus to start a cycle of operations of the machine, a device for initially preventing such actuation of the clutch by the starting member, means requiring the use of the operator's other hand to move said device to an idle position to permit the actuation of the clutch by the starting member and to hold it in that position until the clutch is actuated, means for stopping the machine automatically by control of said clutch prior to the end of the cycle, and automatic means for holding said device in its idle position when the machine is thus stopped to permit the machine again to be started by said starting member.

5. In a power-operated machine for operating on shoes presented to the machine by the operator, a starting member arranged to be moved by one of the operator's hands to start a cycle of operations of the machine, means requiring the use of the operator's other hand when said starting member is operated to render said member effective thus to start the machine, a shoe support movable into position to support the shoe, a treadle for thus moving said shoe support prior to the operation of said starting member, means for stopping the machine automatically prior to the end of the cycle, and means for rendering said treadle effective to start the machine again after it has thus been stopped.

6. In a power-operated machine for operating on shoes presented to the machine by the operator, a clutch through which the machine is operated, a starting member arranged to be moved by one of the operator's hands to actuate said clutch and thus to start a cycle of operations of the machine, means requiring the use of the operator's other hand when said starting member is operated to render said member effective thus to actuate the clutch, a shoe support movable into position to support the shoe, a treadle for thus moving the shoe support prior to the starting of the machine, means for stopping the machine automatically prior to the end of the cycle, and means movable in the cycle of operations prior to such stopping of the machine into position to render said treadle effective to actuate the clutch and thereby to start the machine again after it has thus been stopped.

7. In a power-operated machine for operating on shoes presented to the machine by the operator, a clutch through which the machine is operated, a starting member arranged to be moved by one of the operator's hands to actuate said clutch and thus to start a cycle of operations of the machine, means requiring the use of the operator's other hand when said starting member is operated to render said member effective thus to actuate the clutch, a shoe support movable into position to support the shoe, a treadle for thus moving the shoe support prior to the starting of the machine, means for stopping the machine automatically prior to the end of the cycle, a member arranged to be moved idly by said treadle in thus moving the shoe support, and means for moving said member in the cycle of operations prior to such stopping of the machine into position to actuate the clutch and thereby to start the machine again in response to a second depression of the treadle after the machine has thus been stopped.

8. In a power-operated machine for operating on shoes presented to the machine by the operator, a clutch through which the machine is operated, a starting member arranged to be moved by one of the operator's hands to actuate said clutch and thus to start a cycle of operations of the machine, means requiring the use of the operator's other hand when said starting member is operated to render said member effective thus to actuate the clutch, a shoe support movable into position to support the shoe, a treadle for thus moving the shoe support prior to the starting of the machine, a rockshaft movable by said treadle, an arm loosely mounted on said rockshaft for actuating the clutch by the movement of said starting member, means for stopping the machine automatically prior to the end of the cycle, a member carried by said rockshaft, and automatic means for moving said last-named member after the starting of the cycle into position to act on said arm and thus to actuate the clutch to start the machine again in response to a second depression of the treadle after the machine has thus been stopped.

9. In a power-operated machine for operating on work presented thereto, a starting member arranged to be moved by one of the operator's hands to start a cycle of operations of the machine, means requiring the use of the operator's other hand when said starting member is operated to render said member effective thus to start the machine, a member movable into position to control the work, a treadle for thus moving said controlling member prior to the operation of said starting member, means for stopping the machine automatically prior to the end of the cycle, and means for rendering said treadle effective to start the machine again after it has thus been stopped.

10. In a power-operated machine for operating on work presented thereto by the operator, a starting member movable manually by the operator to start a cycle of operations of the machine, a member movable into position to control the work, a treadle for thus moving said controlling member and for holding it in work-controlling position until after the operation of said starting member, means for stopping the machine automatically prior to the end of the cycle, and means for rendering said treadle effective to start the machine again after it has thus been stopped.

11. In a power-operated machine for operating on work presented thereto by the operator, a starting member movable manually by the operator to start a cycle of operations of the machine, a member movable into position to control the work, a treadle for thus moving said controlling member and for holding it in work-controlling position until after the operation of said starting member, means for stopping the machine automatically prior to the end of the cycle, a device arranged to be moved idly by said treadle in thus moving said controlling member, and means for thereafter moving said device into position to render the treadle effective to start the machine again after it has thus been stopped.

12. In a power-operated machine for operating on work presented thereto by the operator, a clutch through which the machine is operated, clutch-tripping mechanism, a starting member movable manually by the operator to operate said clutch-tripping mechanism and thus to start a cycle of operations of the machine, a member movable into position to control the work, a treadle for thus moving said controlling member and for holding it in work-controlling position until after the operation of said starting member, means for stopping the machine automatically prior to the end of the cycle, a device mounted for movement into or out of position to transmit movement from said treadle to said clutch-tripping mechanism, and automatic means for moving said device into that position only after the starting of the machine by said manually operated starting member to render the treadle effective to start the machine again after it has thus been stopped.

FRED T. MacKENZIE.

REFERENCES CITED

The following references are of record in the file of this patent:

UNITED STATES PATENTS

| Number | Name | Date |
|---|---|---|
| 1,525,457 | MacDonald | Feb. 10, 1925 |
| 1,683,693 | O'Sullivan | Sept. 11, 1928 |
| 1,701,822 | Nordquist | Feb. 12, 1929 |
| 1,938,689 | Buckminster | Dec. 12, 1933 |
| 1,987,173 | Willey | Jan. 8, 1935 |
| 2,315,548 | Schoenky | Apr. 6, 1943 |
| 2,355,119 | Stratton | Aug. 8, 1944 |